(12) United States Patent
Furze et al.

(10) Patent No.: US 11,992,733 B1
(45) Date of Patent: *May 28, 2024

(54) CONCENTRICITY MEASUREMENT AND CLASSIFICATION SYSTEM AND METHOD FOR GOLF BALLS AND GOLF BALL COMPONENTS

(71) Applicant: Acushnet Company, Fairhaven, MA (US)

(72) Inventors: Paul Furze, Tiverton, RI (US); Brian Comeau, Berkley, MA (US); Nicholas Nardacci, Barrington, RI (US); Edward Costa, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 397 days.

This patent is subject to a terminal disclaimer.

(21) Appl. No.: 17/365,313

(22) Filed: Jul. 1, 2021

(51) Int. Cl.
*A63B 47/00* (2006.01)
*A63B 37/00* (2006.01)
*G06T 7/00* (2017.01)

(52) U.S. Cl.
CPC ........ *A63B 47/008* (2013.01); *A63B 37/0077* (2013.01); *G06T 7/0004* (2013.01); *G06T 2207/10012* (2013.01); *G06T 2207/10116* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 6,390,937 B1 | 5/2002 | Marshall et al. | |
| 6,757,353 B2 | 6/2004 | Furze | |
| 6,928,140 B2 | 8/2005 | Furze | |
| 7,777,871 B2* | 8/2010 | McNamara | G01N 3/08 356/72 |
| 7,806,589 B2* | 10/2010 | Tashman | A61B 6/505 378/197 |
| 8,008,641 B2 | 8/2011 | Harris et al. | |
| 11,058,924 B1 | 7/2021 | Caterina et al. | |
| 11,193,761 B2* | 12/2021 | Cardoso | G06T 7/60 |
| 11,262,318 B2* | 3/2022 | Salamon | G01N 23/046 |
| 11,493,334 B2* | 11/2022 | Cosneau | G01B 15/025 |
| 11,543,241 B1* | 1/2023 | Furze | G01B 5/0023 |
| 11,590,394 B1* | 2/2023 | Caterina | G01N 23/04 |
| 11,668,560 B1* | 6/2023 | Furze | G06T 7/0004 378/62 |
| 11,752,396 B1* | 9/2023 | Caterina | G01N 23/18 378/62 |
| 2004/0042586 A1* | 3/2004 | Furze | G01N 23/04 378/162 |
| 2004/0196956 A1* | 10/2004 | Furze | G01N 23/04 378/58 |

(Continued)

*Primary Examiner* — Thomas R Artman
(74) *Attorney, Agent, or Firm* — Bradley Arant Boult Cummings LLP

(57) ABSTRACT

Systems and methods for measuring and classifying golf balls and/or components thereof according to concentricity including automated inspection systems that can simultaneously image multiple golf balls (or components thereof) to gather and analyze data on concentricity and, optionally, classify or sort the multiple golf balls (or components thereof) according to the analyzed concentricity data.

20 Claims, 10 Drawing Sheets

(56) References Cited

U.S. PATENT DOCUMENTS

| | | | |
|---|---|---|---|
| 2009/0080598 A1* | 3/2009 | Tashman | A61B 5/1038 378/11 |
| 2009/0268215 A1* | 10/2009 | McNamara | G01N 3/08 73/818 |
| 2020/0300619 A1* | 9/2020 | Cosneau | G06T 7/55 |
| 2021/0164778 A1* | 6/2021 | Cardoso | G06T 7/0004 |
| 2022/0214290 A1* | 7/2022 | Maeder | G01B 11/272 |

\* cited by examiner

CONCENTRICITY MEASUREMENT AND CLASSIFICATION SYSTEM AND METHOD FOR GOLF BALLS AND GOLF BALL COMPONENTS

FIELD OF THE INVENTION

The present disclosure relates generally to systems for measuring and classifying golf balls and/or golf ball components according to concentricity. More particularly, the present disclosure relates to automated inspection systems that can simultaneously image multiple golf balls or components thereof to gather and analyze data on concentricity and, optionally, classify or sort the multiple golf balls or components thereof according to the analyzed concentricity data.

BACKGROUND OF THE INVENTION

Golf balls typically include a center or core and at least one cover layer. Manufacturers are continually refining processes to avoid center shift of multi-layer golf balls. For example, to make a dual core using compression molding, an inner core must be placed within two outer core shells in a mold press assembly and then the assembly is heated under pressure at a precise temperature for a predetermined period of time to allow for crosslinking. To make a dual core using injection molding or casting, the inner core is positioned in a mold (typically held in place with a retractable pin for injection molding and vacuum or suction for casting) and then the cover material is injected/poured into the mold and the holding mechanism is retracted/released. When done properly, the result is a golf ball with no substantive center shift. In contrast, variances in the manufacturing process may result in a golf ball with a certain degree of center shift.

Such lack of concentricity or centeredness of the golf ball layers may result in performance inadequacies and can affect shot dispersion. As a result, most manufacturers have some form of a quality check on manufactured golf balls and/or golf ball components to determine whether they are within predefined tolerances. While the most common way to analyze concentricity is to cut a golf ball in half and measure the thickness of the outer layer at several points around the ball, there are ways to determine concentricity without cutting into or deconstructing the golf ball. For example, x-ray inspection may be used to image a golf ball and calculate concentricity.

In one method, an image of a control golf ball is taken and stored so that images of samples can be compared to the control. Any differences between the control image and the sample are used to determine the amount of error in the sample. However, this method is compromised if the control golf ball has any degree of center shift and/or is positioned incorrectly or moved during imaging. In another method, a golf ball is x-rayed in such a way that both the core and any outer core or cover layers and the thickness of the layers can be measured. This method generally requires the use of low energy x-rays so that the cover material can be seen clearly in the resulting image, but this lower power may cause the edges of the image to become distorted or less clear. Also, the image intensifier, used to convert x-rays to visible light, must have sufficient resolution to produce a high quality image.

In both imaging methods, the golf ball can be doped to assist in cover detection. In fact, U.S. Pat. No. 6,390,937 generally discloses a method for determining concentricity of a golf ball where the golf ball has a barium or bismuth doped boundary layer or cover such that the x-ray image is sufficiently enhanced to make the necessary measurements and calculations. However, doping may alter performance characteristics of the ball.

Regardless of whether the method is destructive or non-destructive, none of the known methods allow for multiple golf balls to be quickly and efficiently inspected and categorized such that the inspection may occur with little to no disruption to the production line. Accordingly, there remains a need for an accurate system and method of automated, rapid measurement and classification of single, dual, or multi-core concentricity for a plurality of golf balls. Moreover, given the high production rates of golf ball manufacturing plants, such a system and method would allow for quicker adjustments during manufacturing should a persistent issue be identified with the concentricity of the golf balls coming off the line and prevent/reduce further production of non-concentric balls.

SUMMARY OF THE INVENTION

The present invention is directed to a system for determining eccentricity of a plurality of golf balls, including: a radiolucent ball-holding apparatus configured to secure a plurality of golf balls therein, wherein each of the plurality of golf balls comprise a center and a cover; an imaging system comprising at least one x-ray source and an imager capable of obtaining a first image of the plurality of golf balls at a first orientation and a second image of the plurality of golf balls at a second orientation, wherein the first orientation and the second orientation are perpendicular; an analyzer operatively coupled to the imaging system and capable of performing an inspection routine on the first and second images comprising determining eccentricity for each of the plurality of golf balls based on a first eccentricity of each corresponding golf ball in the plurality of golf balls at the first orientation and a second eccentricity of each corresponding golf ball in the plurality of golf balls at the second orientation and determining whether the eccentricity meets at least one predetermined threshold; and a sorting mechanism operatively coupled to the analyzer and capable of classifying each of the plurality of golf balls according to the at least one predetermined threshold.

In one embodiment, the first orientation is along the equator of the golf balls. In another embodiment, the ball-holding apparatus is capable of rotating between the first and second orientations. In yet another embodiment, the ball-holding apparatus is capable of rotating each of the plurality of golf balls therein from the first orientation to the second orientation. In still another embodiment, the x-ray source is capable of rotating from a first angle and a first position to a second angle and a second position.

The plurality of golf balls may include at least two golf balls. In one embodiment, the plurality of golf balls includes at least four golf balls. In another embodiment, each of the plurality of golf balls further includes an outer core layer disposed about the center to form an inner ball, and the cover is disposed about the inner ball.

The present invention is also directed to a system for determining eccentricity of a plurality of golf balls, including: a radiolucent ball-holding apparatus configured to secure a plurality of golf balls therein, wherein each of the plurality of golf balls comprise a center and a cover; a first imaging system comprising a first x-ray source and a first imager capable of obtaining a first image of the plurality of golf balls at a first orientation; a second imaging system comprising a second x-ray source and a second imager capable of obtaining a second image of the plurality of golf balls at a second orientation, wherein the first orientation and the second orientation are perpendicular; an analyzer operatively coupled to the imaging system and capable of calculating eccentricity for each of the plurality of golf balls from the first and second images based on the following equation:

$$E_{actual} = \sqrt{(\Sigma_{AoR}^2 + E_1^2 + E_2^2)}$$

where $E_{AoR}$ is the eccentricity along an axis of rotation, $E_1$ is center shift along an axis perpendicular to the axis of rotation calculated from the first image, and $E_2$ is center shift along an axis perpendicular to both the axis of rotation and the axis of $E_2$ calculated from the second image, wherein the analyzer is capable of determining whether the calculated eccentricity meets or exceeds a predefined threshold; and a sorting mechanism operatively coupled to the analyzer and capable of assigning a category to each of the plurality of golf balls according to the predefined threshold.

In this aspect, the plurality of golf balls may include at least two golf balls. In one embodiment, the plurality of golf balls includes at least four golf balls. In another embodiment, each of the plurality of golf balls further includes an outer core layer disposed about the center to form an inner ball, and the cover is disposed about the inner ball.

In one embodiment, the first and second images are obtained simultaneously. In another embodiment, the first and second images are obtained sequentially. In yet another embodiment, the first orientation is along the equator of the golf balls. In still another embodiment, the sorting mechanism further comprises a removal apparatus capable of removing a golf ball from the ball-holding apparatus depending on the assigned category.

The present invention also relates to a method of determining concentricity of a plurality of golf balls, including: providing a plurality of golf balls each comprising a center and a cover; securing the plurality of golf balls in a holding apparatus, wherein the holding apparatus is radiolucent; providing at least one x-ray imaging system comprising an x-ray source and an imager; capturing a first x-ray image of the plurality of golf balls about a first axis; capturing a second x-ray image of the plurality of golf balls about the second axis, wherein the second axis is at an angle α to the first axis; and, using a processor operatively connected to the x-ray imaging system, determining eccentricity for each of the plurality of golf balls from the first and second x-ray images based on the following equation:

$$E_{actual} = \sqrt{(\Sigma_{AoR}^2 + E_1^2 + E_2^2)}$$

where $E_{AoR}$ is the eccentricity along an axis of rotation, $E_1$ is center shift along an axis perpendicular to the axis of rotation calculated from the first image, and $E_2$ is center shift along an axis perpendicular to both the axis of rotation and the axis of $E_1$ calculated from the second image; and categorizing each of the plurality of golf balls based on whether the calculated eccentricity meets or exceeds a predetermined threshold.

In one embodiment, before the step of capturing the first x-ray image, the method further includes the step of rotating the holding apparatus to a first angle. In another embodiment, before the step of capturing the second x-ray image, the method further includes the step of rotating the holding apparatus to a second angle, wherein the second angle is perpendicular to the first. In yet another embodiment, the angle α is 90°. In still another embodiment, the step of providing at least one x-ray imaging system includes providing a first x-ray imaging system including a first x-ray source and a first imager and a second x-ray imaging system including a second x-ray source and a second imager, wherein the first and second x-ray imaging systems are positioned perpendicular to each other, and wherein the first imaging system captures the first x-ray image and the second imaging system captures the second x-ray image.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
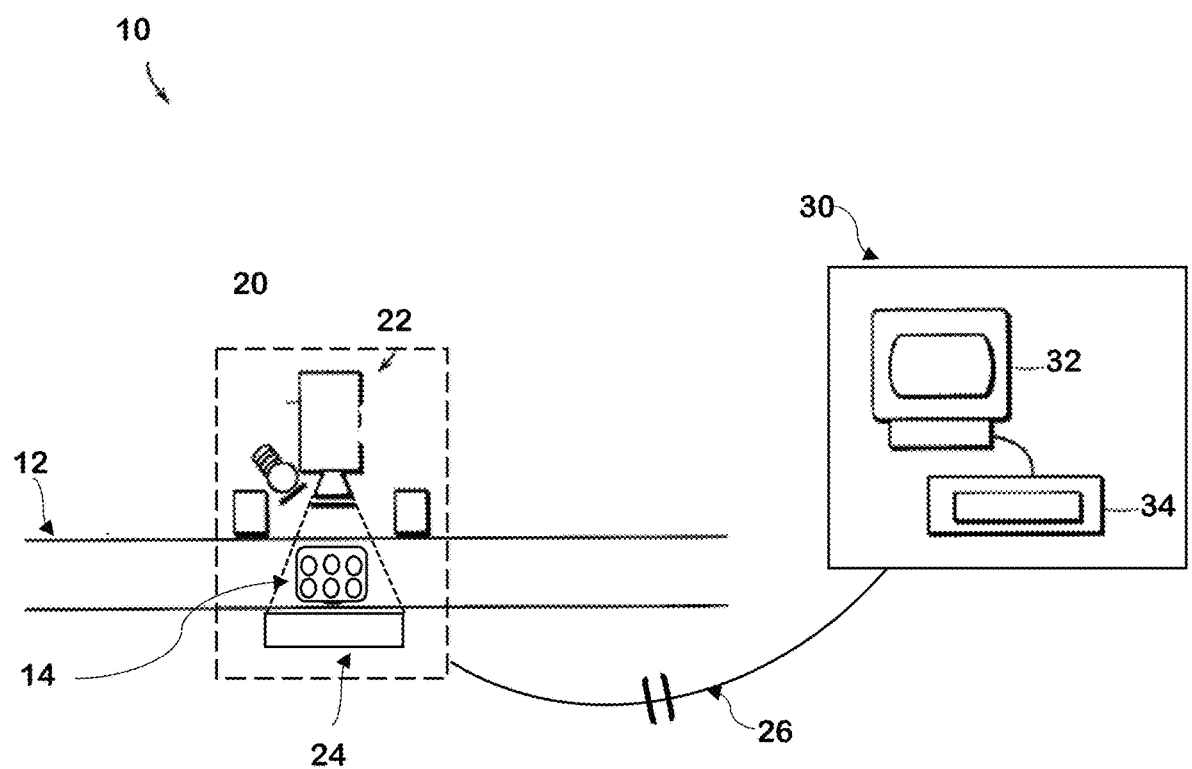
FIG. 1 is a schematic diagram of an inspection system of the present invention.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The term "plurality" shall generally mean more than one.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The present disclosure provides a system and method for automated and/or rapid concentricity measurements for a plurality of golf balls. Advantageously, by obtaining and using multiple radiographs/images of the plurality of golf balls, the process for inspecting and quantifying concentricity and then classifying a group of golf balls based on such quantification is more accurate and faster than currently employed methods. In addition, the systems and methods of the present invention allow for quantification and classification based on concentricity in a non-destructive manner. More specifically, the present invention employs x-ray imagery to obtain from a group of balls data relevant to concentricity and perform accurate calculations of concentricity in three dimensions based on that data, which then allows for sorting or classifying the group of balls based on the data.

In this aspect, at least two images are obtained of a plurality of golf balls from at least one inspection system. In particular, the multiple images are used to accurately calculate concentricity of the golf ball in three dimensions. In one embodiment, a plurality of golf balls are secured in a ball-holding apparatus (as discussed in more detail below) where a first image is captured of the plurality of golf balls while in a first position and a second image is captured after the plurality of golf balls are each rotated to a second position. In another embodiment, a plurality of golf balls are secured in a ball-holding apparatus for a first image capture. The ball-holding apparatus is then rotated on an axis perpendicular to the axis in which the balls are held in place for a second image capture.

In still another embodiment, a plurality of golf balls are secured in a stationary ball-holding apparatus. A first imaging system at a first angle and first distance from the ball-holding apparatus captures a first image of the plurality of golf balls and a second imaging system at a second angle and a second distance from the ball-holding apparatus captures the second image of the plurality of golf balls. In yet another embodiment, a plurality of golf balls are secured in a stationary ball-holding apparatus. An imaging system at a first location captures a first image of the plurality of golf balls and then moves to a second location to capture a second image of the plurality of golf balls. The first location has a first angle and a first distance from the ball-holding apparatus and the second location has a second angle and a second distance from the ball-holding apparatus. In this aspect, the first and second locations are different from each other in at least the angle or distance from the ball-holding apparatus. In one embodiment, the first angle is different from the second angle and the first distance is different from the second distance.

Imaging System

An inspection system of the present invention includes at least one imaging system capable of capturing a plurality of images of the plurality of golf balls under inspection. An analyzer coupled to the imaging system receives the captured images and performs an inspection routine on the images. With reference to FIG. 1, inspection system 10 comprises an imaging system 20 that includes at least one x-ray source 22 and an imager 24, which is connected via an electronic link 26 to an automated analyzer 30. As generally shown, the ball-holding apparatus 14 (discussed in more detail below) is between the x-ray source 22 and the imager 24. In one embodiment, the x-ray source is at a fixed position and angle in relation to the ball-holding apparatus. For example, the x-ray source may be positioned vertically over the ball-holding apparatus 14 and imager 24.

The x-ray source should be positioned sufficiently far from the ball-holding apparatus so that all balls contained in the ball-holding apparatus are subject to x-rays and imaged (as shown in FIGS. 1, 2A-2B, and 3A-3B). More specifically, the x-ray source is positioned in relation to the ball-holding apparatus such that the emitted radiation is transmitted through the group of golf balls and onto the imager. In one embodiment, the x-ray source is located at a first distance from the ball-holding apparatus and the imager is located at a second distance from the ball-holding apparatus that is less than the first distance. In another embodiment, the x-ray source is located at a first distance from the ball-holding apparatus and the imager is located at a second distance from the ball-holding apparatus where the ratio of the first to second distance is about 3:1 to about 1:1. In yet another embodiment, the x-ray source is located about 12 to 20 inches from the ball-holding apparatus and the imager is located about 8 to 20 inches from the ball-holding apparatus. In still another embodiment, the x-ray source is located about 5 to 15 inches from the ball-holding apparatus and the imager is located about 3 to 15 inches from the ball-holding apparatus.

Figure 2A:
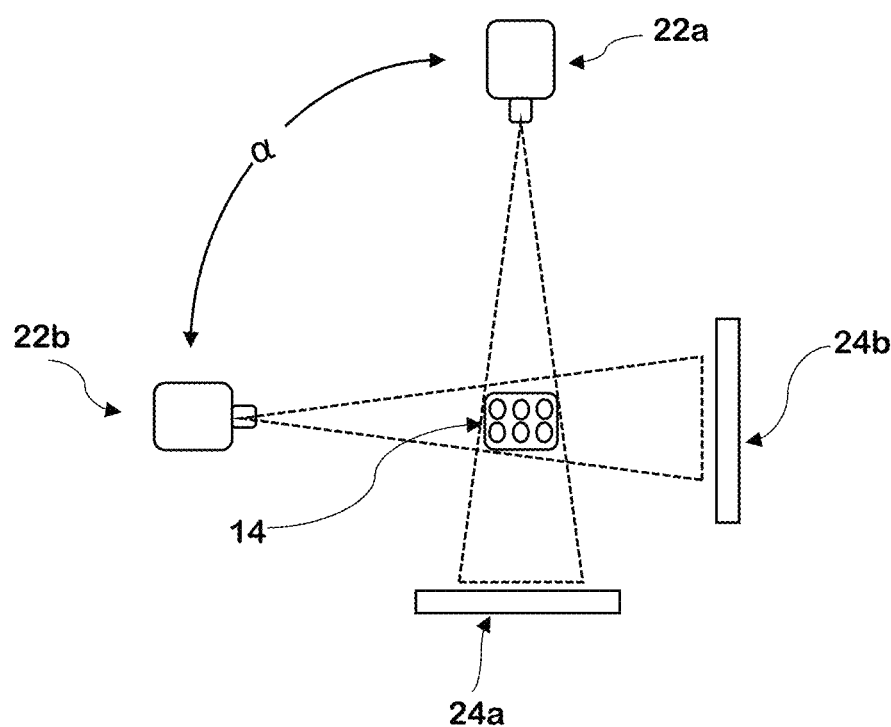
FIG. 2A is a schematic diagram illustrating an imaging system in accordance with an embodiment of the present invention.

In another embodiment, the imaging system includes at least two x-ray sources, where the first x-ray source is at a first position and first angle and the second x-ray source is at a second position and a second angle. As shown in FIG. 2A, a first x-ray source 20a is positioned at a first angle that is perpendicular to the second angle at which the second x-ray source 20b is positioned such that the angle α between the two x-ray sources is 90°. The x-ray sources 20a and 20b may be positioned vertically over the respective imagers 24a and 24b with the ball-holding apparatus 14 situated therebetween. In this regard, the images obtained from the first and second imaging systems (i.e., a first x-ray source and a first imager and a second x-ray source and second imager, respectively) may be obtained simultaneously or sequentially.

Figure 2B:
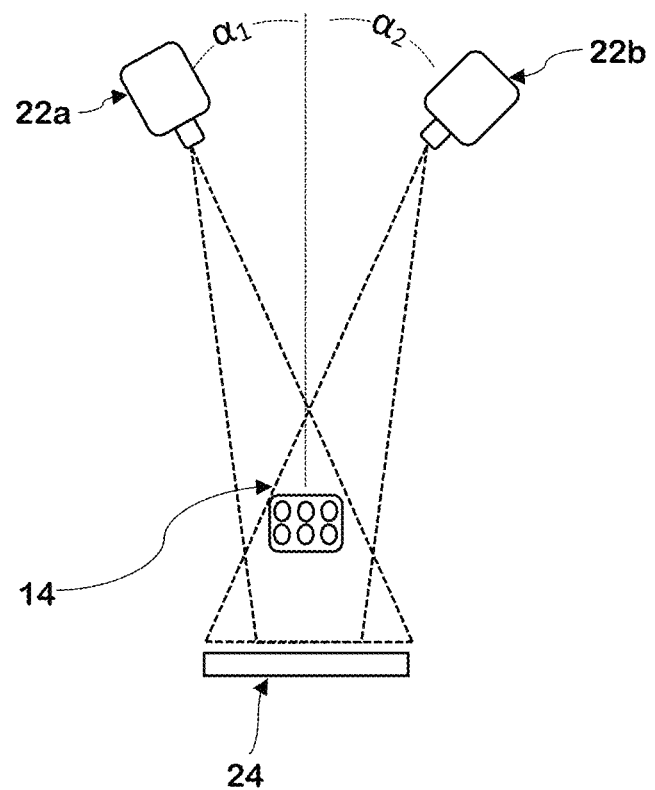
FIG. 2B is a schematic diagram illustrating an imaging system in accordance with an embodiment of the present invention.

As shown generally in FIG. 2B, a first x-ray source 20a is positioned at a first angle $\alpha_1$ and a first position $X_1$, $Y_1$, and a second x-ray source 20b is positioned at a second angle $\alpha_2$ and a second position $X_2$, $Y_2$ (where $X_1$ and $X_2$ represent the horizontal distance and $Y_1$ and $Y_2$ represent the vertical distance from the ball-holding apparatus 14 for each of the first and second x-ray source. In this aspect, either or both of the second position and second angle are different from the first position and first angle. In one embodiment, the first angle and second angle are perpendicular to each other. In another embodiment, the first angle is 45° and the second angle is −45°. In another embodiment, the first angle is 35° and the second angle is −35°. In this aspect, FIG. 2B reflects a single imager 24. As would be appreciated by a person of ordinary skill in the art, this arrangement would require sequential imaging, i.e., the first image is obtained from the first x-ray source 20a and thereafter the second image is obtained from the second x-ray source 20b, and the imager 24 would have to be of sufficient size to capture the entirety of the balls to be imaged from both x-ray sources 20a and 20b or the angles $\alpha_1$ and $\alpha_2$ would have to be sufficiently small. A mechanical shutter or other similar mechanism may be used to turn off the x-ray source not being used during imaging.

In another embodiment, the imaging system includes one x-ray source that is configured to be adjustable in position, angle, or a combination thereof. For example, the x-ray source may be adjustable in position in relation to the ball-holding apparatus. In this regard, as shown generally in FIG. 3A, the x-ray source 20c and imager 24c are adjustably positioned at a first angle in relation to the ball-holding apparatus and capable of moving or being moved to a second angle to capture multiple images of the balls contained in the ball-holding apparatus. For example, the x-ray source 20c and imager 24c positioned at a first angle $\alpha_2$ and a first position $X_1$, $Y_1$ may be adjusted to a second angle $\alpha_3$ and a second position $X_2$, $Y_2$ (where $X_1$ and $X_2$ represent the horizontal distance and $Y_1$ and $Y_2$ represent the vertical distance from the ball-holding apparatus 14 for each of the first and second positions). In one embodiment, the first angle and second angle are perpendicular to each other. In another embodiment, the first angle is 45° and the second angle is −45°.

Figure 3A:
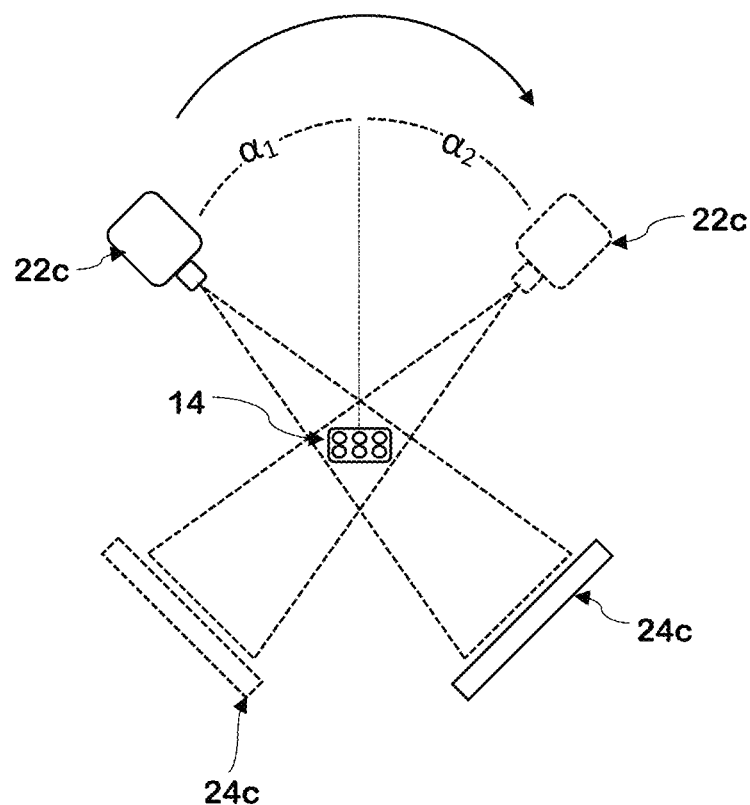
FIGS. 3A-3B are schematic diagrams illustrating an imaging system in accordance with an embodiment of the present invention.
Figure 3B:
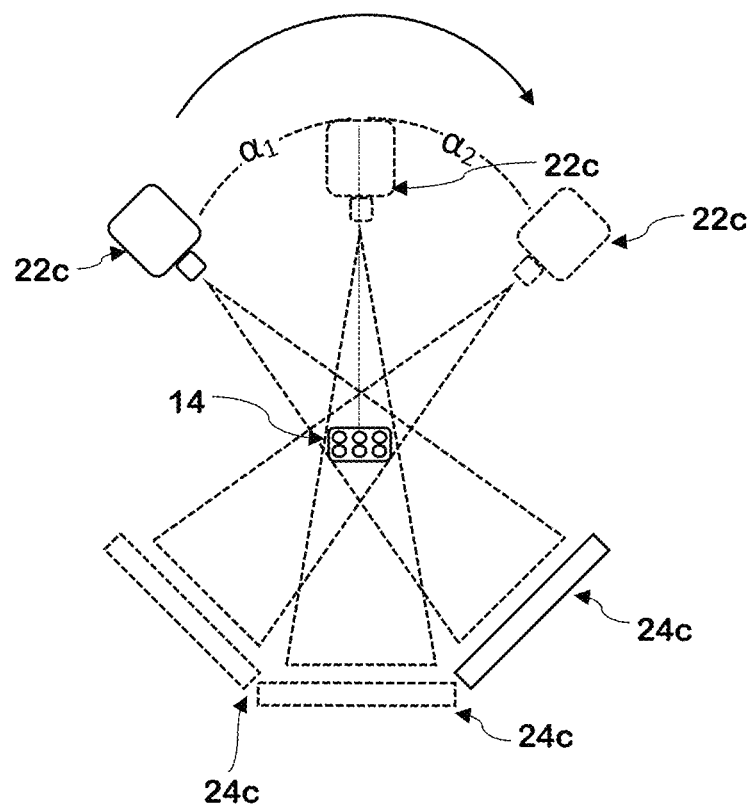
Figure 4:
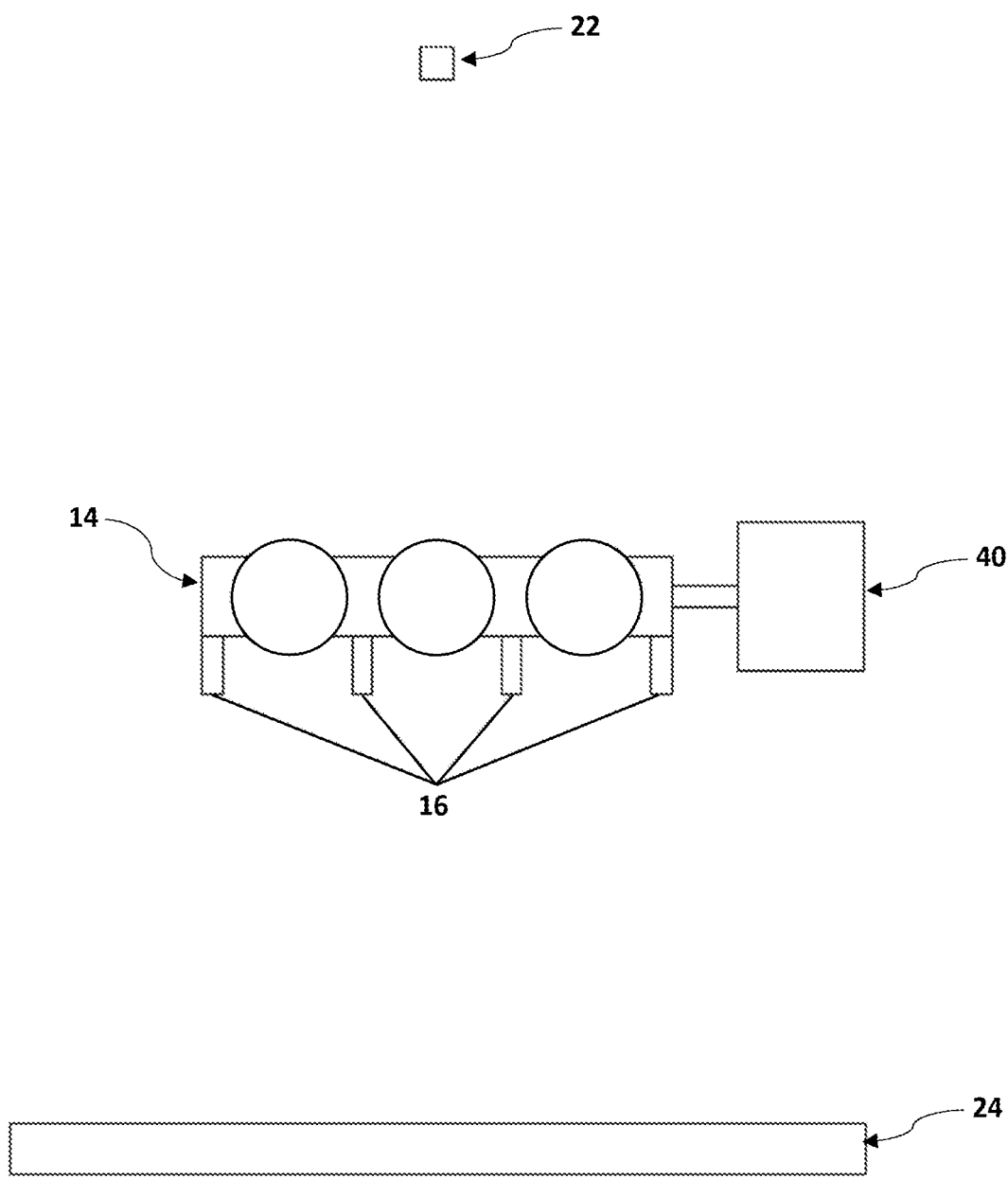
FIG. 4 is a schematic diagram illustrating a ball-holding apparatus according to an embodiment of the present invention.

In still another embodiment, the x-ray source may be adjustable within a limited angle range to obtain a corresponding number of images of the balls contained in the ball-holding apparatus. For example, as shown in FIG. 3B, x-ray source 20c and imager 24c may be adjusted at various positions and angles to obtain desired images of the balls contained in the ball-holding apparatus. In one embodiment, x-ray source 20c and imager 24c may move from a first angle to a second angle to the third angle where at least two of the angles are perpendicular to each other so that the concentricity measurements have a high degree of accuracy.

The x-ray source may emit x-rays at an energy level sufficient to penetrate the balls and provide adequate contrast between the layers. In one embodiment, the energy level is from about 40 kVp and 150 kVp. In another embodiment, the energy level is between about 40 kVp and 75 kVp. In yet another embodiment, the energy level is between about 45 kVp and 70 kVp. In still another embodiment, the energy source is between about 50 kVp and 65 kVp. The energy level may also be between about 80 kVp and 150 kVp. In one embodiment, the energy level is about 100 kVp to about 130 kVp. Energy levels of the x-ray source may be changed by adjusting the energy level of the X-ray source or by introducing a filter between the X-ray source and the imager. In this regard, filter materials between the x-ray source and ball-holding apparatus may be chosen to select specific X-ray spectra that highlight certain elements and can increase contrast between layers that might not exhibit much contrast in a full spectrum image, at any energy level. In one embodiment, the imaging system of the present invention includes filter materials that are chosen in Ross pairs in an effort to target specific, narrow X-ray spectra to increase contrast between layers.

In one embodiment, the x-ray focal spot size is about 0.035 inches by 0.035 inches. In another embodiment, the x-ray focal spot size is less than about 0.005 inches by 0.005 inches. In yet another embodiment, the x-ray focal spot size is less than about 0.001 inches by 0.001 inches. In one aspect, the imager 24 may be a digital imager. In another aspect, the imager 24 may include a scintillating plate, image intensifier, and digital photosensor (not shown). In particular, after the x-ray radiation passes through the golf balls, the scintillating plate produces an image in the visible electromagnetic range, which then passes to an image intensifier, and is projected onto a screen that allows image capture by a digital photosensor.

Ball-Holding Apparatus

The ball-holding apparatus may be designed in any way that holds a plurality of golf balls in place during imaging. The ball-holding apparatus may be a matrix capable of retaining two to twelve golf balls. In one aspect, the ball-holding apparatus includes one or more rows with cavities to allow for at least two golf balls to be stationary during imaging. In another embodiment, the ball-holding apparatus includes at least two rows with at least two cavities in each row. In still another embodiment, the ball-holding apparatus includes at least three rows with at least two cavities in each row. In yet another embodiment, the ball-holding apparatus includes at least four rows with at least two cavities in each row.

The ball-holding apparatus may be capable of rotating the balls held therein. For example, in one embodiment, the ball-holding apparatus may remain stationary during x-ray inspection, but imaging of the balls at different orientations is accomplished by rotating the balls themselves rather than the imaging system(s) or ball-holding apparatus as in other embodiments described herein. In one embodiment, the ball-holding apparatus includes spindles or a similar rotating sub-apparatus to rotate the balls. In another embodiment, the ball-holding apparatus may hold the balls through vacuum/suction or otherwise until it is time to rotate the balls to a different orientation (or as discussed later, dispense a ball or balls as the result of the sorting process). In this aspect, the balls may be clamped in rotating spindles or secured in rotating cups that allow for holding the balls in a first orientation for a first image capture and then rotating the golf balls to a second orientation for a second image capture. In one embodiment, the ball-holding apparatus includes a plurality of c-shaped cups that compress on each ball at a first orientation for a first image capture, then release and rotate the balls to a second orientation for a second image capture. The first and second orientations may be along the equator and the poles of the golf balls. Any method of rotating the spindles or cups may be used including a rotary actuator.

The ball-holding apparatus may also be capable of rotating itself and/or being rotated. In other words, the balls contained in the ball-holding apparatus remain stationary, but the ball-holding apparatus itself rotates the balls contained therein such that the balls are presented to the x-ray source at a first orientation and a second orientation. In one embodiment, the ball-holding apparatus may rotate about the horizontal axis to a first angle for a first image and then to a second angle for a second image. In this aspect, the first angle may be 45° and the second angle may be −45°. Rotation may be accomplished via a number of ways. In one embodiment, a rotary actuator is employed to bring about the desired rotation of the ball-holding apparatus. Similar to the embodiment discussed above, the two orientations may be along the equator and the poles of the golf balls.

Figure 5:
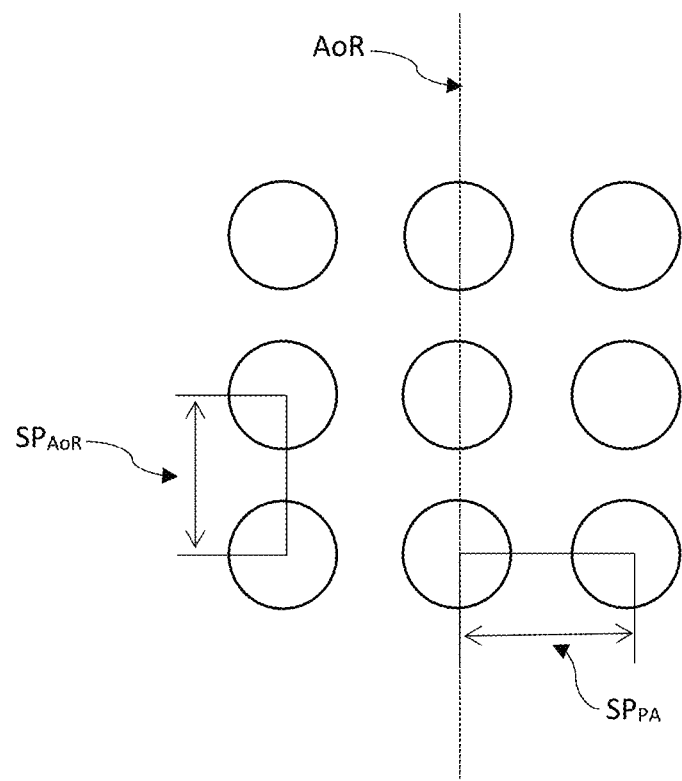
FIG. 5 is a schematic diagram illustrating the spacing of balls in a ball-holding apparatus in accordance with an embodiment of the present invention.

While the layout of the matrix of the golf-ball holding apparatus is not critical, the golf balls may be arranged or spaced as shown in FIG. 5. In this aspect, the ball-holding apparatus may be configured such that the golf balls contained therein are spaced as follows:

$$Sp_{AoR} = D + 0.375 \qquad (1)$$

$$Sp_{PA} = (D + 0.375) * \sqrt{2} \qquad (2)$$

where D is the diameter of the golf ball in inches, $Sp_{AoR}$ is the spacing along the axis of rotation, and $Sp_{PA}$ is the spacing along the axis perpendicular to the axis of rotation. In one embodiment, the axis of rotation is the x-axis and, accordingly, the axis perpendicular to the axis of rotation is the y-axis. Without being bound by any particular theory, the spacing provided for in Equations 1 and 2 above allow similar spacing between the balls in the rotated view when the ball-holding apparatus itself rotates to allow for multiple image capture.

Figure 6:
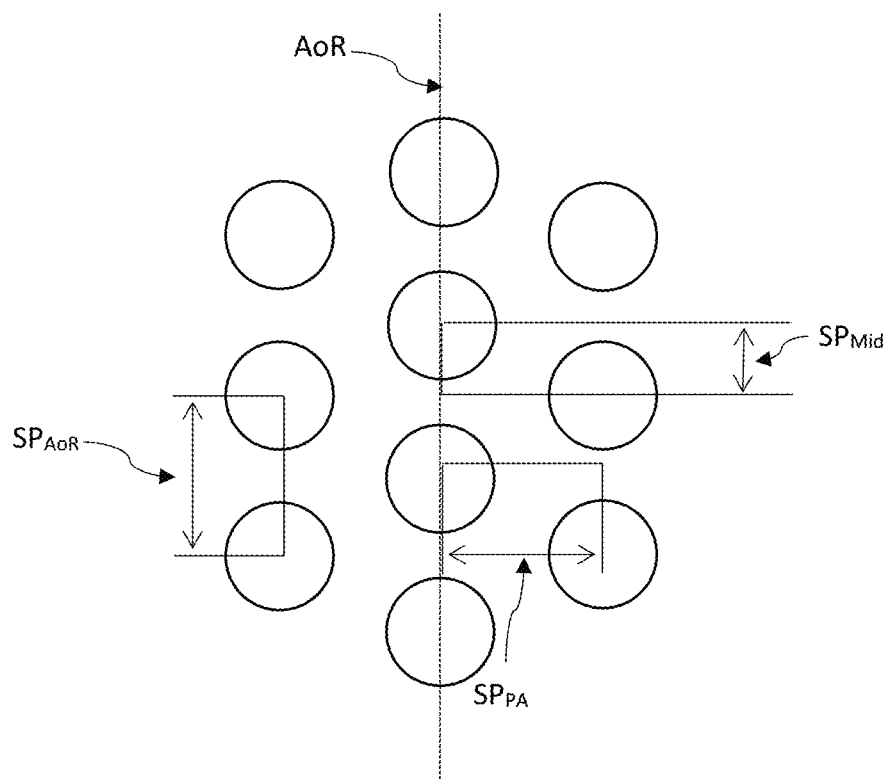
FIG. 6 is a schematic diagram illustrating the spacing of balls in a ball-holding apparatus in accordance with another embodiment of the present invention.

If the middle row of golf balls in the ball-holding apparatus is displaced along the axis of rotation ($Sp_{Mid}$) by half the $Sp_{AoR}$ as shown in FIG. 6, $Sp_{PA}$ may be equal to $Sp_{AoR}$ or (D+0.375). In other words, the following equations 3-5 may apply to a staggered matrix as shown in FIG. 6:

$$Sp_{AoR} = D + 0375 \quad (3)$$

$$Sp_{Mid} = (D + 0.375)/2 \quad (4)$$

$$Sp_{PA} = (D + 0375) \quad (5)$$

In one embodiment, the ball-holding apparatus is formed, at least in part, of a material with low radiopacity. For the purposes of the present invention, low radiopacity means that the material is radiolucent or relatively transparent to the radio wave and X-ray portion of the electromagnetic spectrum such that there is minimal to no interference with measurements, i.e., the relative ability of those kinds of electromagnetic radiation to pass through the material. Without being bound to any particular theory, as opposed to metal markers or doped golf ball layers, a ball-holding apparatus with low radiopacity cannot be easily seen with x-ray imaging because of its high degree of transmission of the x-ray energy. Thus, the only matter between the x-ray source and the imager is the plurality of golf balls secured in the ball-holding apparatus.

In one embodiment, the ball-holding apparatus is formed, at least in part, of a thermoplastic material. In another embodiment, the ball-holding apparatus is formed, at least in part, of at least two thermoplastic materials. The ball-holding apparatus may be formed, at least in part, of polyethylene, polypropylene, or a combination thereof. In another embodiment, the ball-holding apparatus is formed, at least in part, from poly-amide, polycarbonate, or a combination thereof. In yet another embodiment, the ball-holding apparatus is formed, at least in part, from polyetherimide, polyphenylene sulfide, or a combination thereof. In still another embodiment, the ball-holding apparatus is formed, at least in part, from polyaryletherketone. The material used to form the ball-holding apparatus may also include carbon fibers. In particular, carbon fiber reinforcement may be used to increase structural properties of the thermoplastic material yet still maintain transparency to x-rays.

The ball-holding apparatus may be produced using a number of manufacturing methods. As would be appreciated by a person of ordinary skill in the art, the selection of a manufacturing method depends on the material, as well as other factors. Suitable methods for making the ball-holding apparatus include machining, compression molding, injection molding, thermoforming, extrusion, 3D-printing, and combinations thereof.

In one embodiment, the ball-holding apparatus includes at least one metal marker, such as those disclosed in U.S. Pat. No. 6,928,140, which is incorporated by reference in its entirety herein. The metal marker(s) may be formed of any material opaque to x-rays. Indeed, since the marker(s) is opaque to x-rays, it allows the x-ray intensity to be optimized for clearly detecting the edge of the golf ball core without losing contrast and definition of the cover. For example, the metal marker(s) may be aluminum, steel, copper, titanium, or combination thereof. If more than one marker is present, they can be of the same or differing materials or metals. In this aspect, the ball-holding apparatus may include at least one metal marker for each ball secured in the ball-holding apparatus. In one embodiment, the ball-holding apparatus may include at least two metal markers for each ball secured in the ball-holding apparatus. In another embodiment, the ball-holding apparatus may include at least three metal markers for each ball secured in the ball-holding apparatus. In yet another embodiment, the ball-holding apparatus includes at least four metal markers for each ball secured in the ball-holding apparatus. For example, the ball-holding apparatus may include a marker on each side and at the poles of each ball contained therein. The metal markers may be fixedly or removably attached to the ball-holding apparatus. In one embodiment, the metal markers are held against the golf balls with a spring.

Data Collection

The ball-holding apparatus is loaded with one or more golf balls and transported to an imaging system, as shown generally in FIG. 1. In one embodiment, the loaded ball-holding apparatus 14 is conveyed to a predetermined position via a moving belt 12 or other conveyance method to provide transport for the ball-holding apparatus to the position that allows for imaging of the balls in the ball-holding apparatus. In any event, once the ball-holding apparatus is located at the predetermined position, e.g., in the imaging zone, the moving belt 12 may be paused for imaging. In another embodiment, a robotic arm places the loaded ball-holding apparatus 14 at the predetermined position for inspection.

After the ball-holding apparatus is located at the predetermined position, a first image capture at a first orientation is obtained. Depending on the embodiment, the second image capture at a second orientation is obtained shortly thereafter or simultaneously with the first image capture. For example, when the balls themselves are rotated from a first orientation to a second orientation to obtain the two images, the second image capture occurs after the first image capture to allow time for rotation of the balls to the second orientation. In this aspect, the first orientation is along a first axis of the balls and the second position is along a second axis perpendicular to the first axis. Similarly, when the ball-holding apparatus itself is rotated to a second orientation, the second image capture occurs after the first image capture to allow for rotation of the ball-holding apparatus to the second orientation. Likewise, when the different orientations are achieved through adjusting the angle and/or position of the x-ray source, the second image capture occurs after the first image capture to allow for the x-ray source to rotate or swing from a first angle and/or first position to a second angle and/or second position. If multiple imaging systems are configured as generally shown in FIG. 2A and discussed above, the first and second images may be captured simultaneously since no adjustment in position and/or angle of the x-ray source is necessary.

In this aspect, the first orientation provides an image of the group of balls along a first axis of the balls and the second orientation provides an image of the group of balls along a second axis perpendicular to the first axis. The imaging of one group of golf balls, i.e., one ball-holding apparatus at two different orientations, is complete in about 0.5 seconds to about 5 seconds. In one embodiment, the imaging is complete for one ball-holding apparatus in about 0.5 to about 3 seconds. In another embodiment, the imaging is complete in about 0.5 to about 2 seconds. More specifically, once the first image at a first orientation is obtained, the second image at a second orientation is obtained in less than about 5 seconds, less than about 3 seconds, or less than about 2 seconds. In particular, whether the balls themselves are rotated, the ball-holding apparatus is rotated, or the x-ray source is rotated, the time between the first and second image captures is about 0.5 seconds to about 2 seconds. In one embodiment, the time between the first and second image captures is about 0.5 seconds to about 1 second.

Inspection Routine

As shown in FIG. 1, the analyzer 30 may generally include a display 32 and processor 34. While the images of the inspected golf balls may appear on the display 32, this is not essential to the inspection routine. In addition, a freeze frame feature may be provided to freeze a particular image of the balls on display 32 for closer scrutiny while inspection continues. This feature may also permit the scanned image(s) to be stored.

Figure 7:
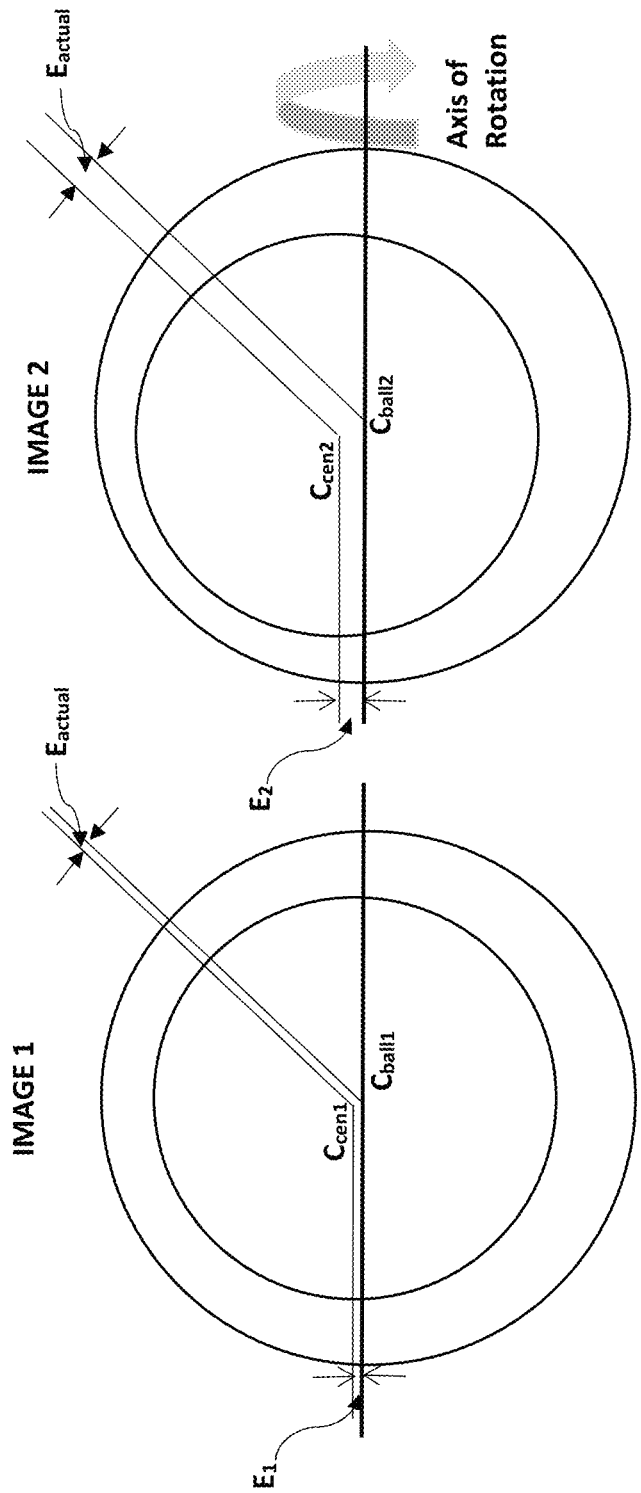
FIG. 7 illustrates a pair of x-ray images of a golf ball according to the present invention.

The inspection routine employs the captured images for each ball-holding apparatus to determine, for each golf ball in the group of golf balls contained in the ball-holding apparatus, the concentricity of the center and any additional outer cores in relation to the outer boundary of the ball. More specifically, for each 2-dimensional image of the group of balls, the centers and edges of the balls (and any edges of outer core/cover layers) are located. In one embodiment, the edge of the center and the edge of the golf ball are determined and the distance between the center and the edge of the golf ball are measured at multiple locations around the ball to calculate eccentricity. As shown generally in FIG. 7, the intersecting lines indicate measurements from the center of the core $C_{cen1}$, $C_{cen2}$ to the edge of the golf ball where Image 1 is taken at a first orientation and Image 2 is taken at a second orientation. The difference between the maximum and minimum distance measure is taken to determine the extent of center shift. While FIG. 7 shows a single ball for ease of explanation, each image will actually include the plurality of golf balls contained in the ball-holding apparatus. Accordingly, the measurements and subsequent calculations are performed on the plurality of golf balls in the ball-holding apparatus. In particular, if the ball-holding apparatus contains four balls, Image 1 would include the four balls at a first orientation and Image 2 would include the four balls at a second orientation and the center shift would be determined as explained herein for each of those balls.

As discussed above, the measurements are taken using the image obtained at the first orientation (the axis of rotation) as well as the image obtained at the second orientation (the axis perpendicular to the axis of rotation) to allow for multiple measurements of eccentricity. The measurements are then combined using the following equation to calculate the actual eccentricity for each ball contained in the ball-holding apparatus:

$$E_{actual} = \sqrt{(\Sigma_{AoR}^2 + E_1^2 + E_2^2)} \quad (6)$$

where $E_{AoR}$ is the eccentricity along the axis of rotation, $E_1$ is the shift from the first image, and $E_2$ is the shift from the second image, e.g., the distances between the center locations of the outer diameter and the center along an axis perpendicular to the axis of rotation. This process may be repeated as necessary if the golf balls inspected include a dual core or a dual cover or some other construction that allows for more than a center and a cover. And, while the system and method herein are described with reference to finished golf balls having at least a core and a cover, the invention is contemplated to be used with golf ball components as well. For example, the method and system described herein may be used with a dual core that is not yet covered with an outer layer. Likewise, the method and system described herein may be used with an intermediate ball including a core, an outer core layer, and a layer disposed on the outer core layer even if the cover layer is not yet disposed thereon.

When all three axes are not mutually perpendicular, i.e., when angle α is not 90°, the measurements may be combined using the following equation to calculate the actual eccentricity for each ball contained in the ball-holding apparatus:

$$E_{actual} = \sqrt{E_{AoR}^2 + E_2^2 + \left(\frac{E_1 - E_2 \cos \alpha}{\sin \alpha}\right)^2} \quad (7)$$

where $E_{AoR}$ is the eccentricity along the axis of rotation, $E_1$ is the shift from the first image, and $E_2$ is the shift from the second image. This process may be repeated as necessary if the golf balls inspected include a dual core or a dual cover or some other construction that allows for more than a center and a cover.

Once the images are captured for each ball-holding apparatus, the concentricity analysis can be completed in about 0.5 seconds to 5 seconds. In one embodiment, the imaging is complete for one ball-holding apparatus in about 0.5 to 3 seconds. In another embodiment, the imaging is complete in about 0.5 to 2 seconds. In this respect, the entire inspection, i.e., the imaging and analysis, for one ball-holding apparatus is complete is about 10 seconds or less, preferably 6 seconds or less. In one embodiment, the entire inspection for one ball-holding apparatus is complete is about 1 second to about 5 seconds. In another embodiment, the inspection for one ball-holding apparatus is complete in about 1 second to about 3 seconds.

Figure 8:
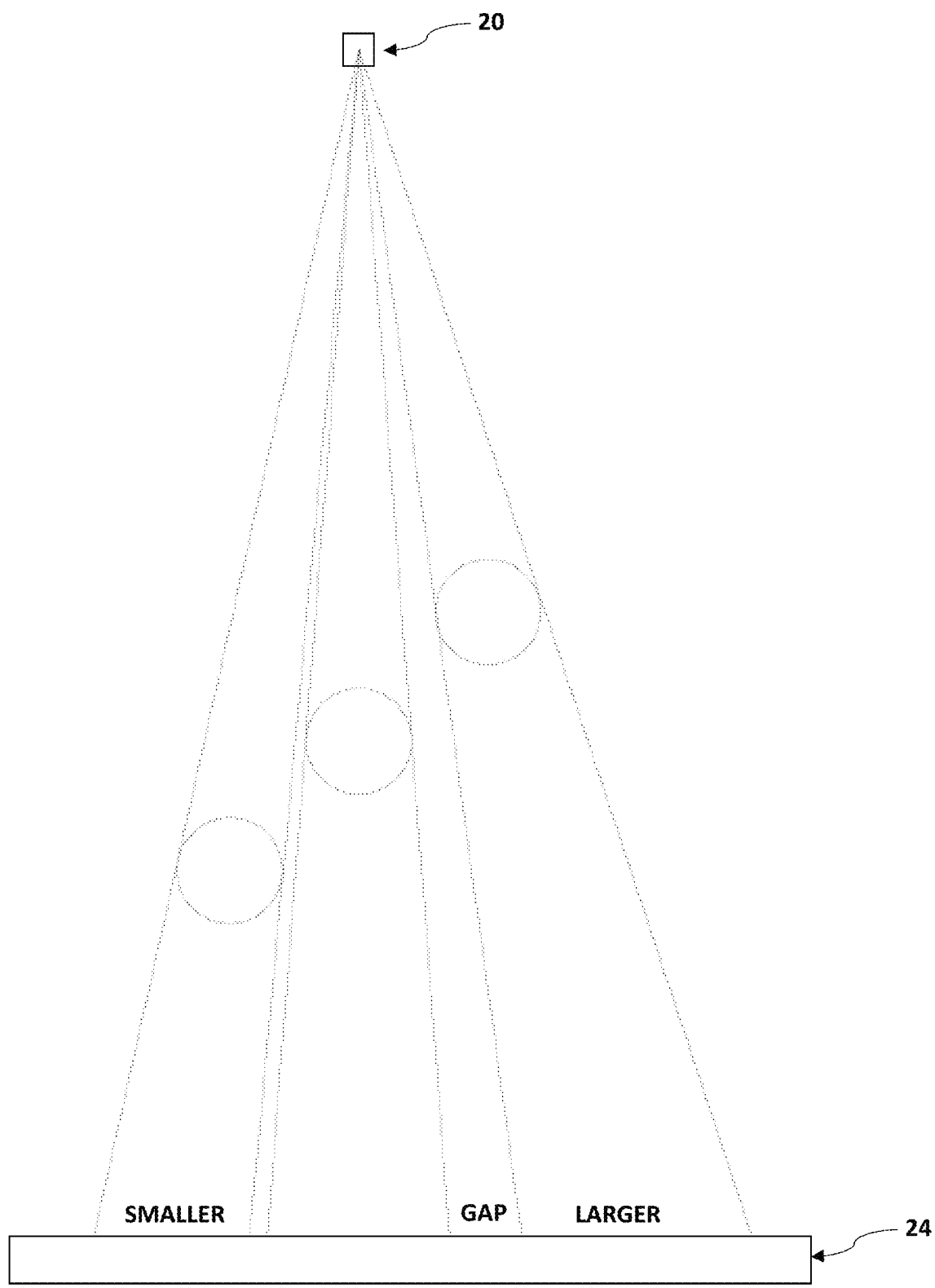
FIG. 8 shows the "distance effect" phenomenon.

The inspection system may also include a calibration module that accounts for the distance of the x-ray source to the golf balls contained in the ball-holding apparatus. In particular, as shown generally in FIG. 8, because golf balls that are closer in distance to or rotated toward the x-ray source 20 will appear in the image capture to be larger than golf balls that are farther in distance or rotated away from the x-ray source ("distance effect"), the imaging system of the present invention may include a method of calibration to account for the distance effect. In one embodiment, the system may be calibrated for each rotational position by using standard vision calibration tools. A nonlimiting example of such a calibration tool is single image calibration, which employs a Halcon calibration plate from MVTec Software GnibH. Calibration may also be accomplished by placing metal markers of a known size or relative location in the ball-holding apparatus (as generally discussed above).

Classification

The inspection system of the present invention may include the ability to sort or classify balls based on chosen pass/fail limits of any measurements and/or predefined thresholds. Those of ordinary skill in the art would recognize that the number of sorting categories and predefined thresholds are not limited by the examples and embodiments described herein. For example, the classification/sorting mechanism may be used to sort golf balls into at least two categories depending on their calculated concentricity values and whether such values meet or exceed predefined thresholds. In one embodiment, the inspection system of the present invention sorts the inspected golf balls into three or more categories. And, as one of ordinary skill in the art would appreciate, the construction of a golf ball will affect the predetermined threshold. In other words, if a group of golf balls have a small center, a larger shift may be more acceptable than if the group of golf balls has a larger center.

In one embodiment, the inspected golf balls may be sorted into at least a first and a second category where the first category includes all golf balls that have a center shift relative to the outer layer thickness of a predefined threshold and a second category that includes golf balls with a center shift relative to the outer layer thickness that does not fall within the predefined threshold. For example, a first category may be golf balls that have a center shift relative to the outer layer thickness of about 8 percent or less and the second category may include all golf balls with a center shift relative to the outer layer thickness of greater than about 8 percent. In one embodiment, the predefined threshold may be about 7 percent or less. In another embodiment, the predefined threshold may be about 6 percent or less. In yet another embodiment, the predefined threshold may be about 5 percent or less. In still another embodiment, the predefined threshold may be about 4 percent or less. In yet another embodiment, the predefined threshold may be about 3.8 percent or less. In this aspect, the inspected golf balls could be separated into a first category containing golf balls with a center shift relative to the outer layer thickness of about 3.5 percent or less and a second category containing those golf balls with a center shift relative to the outer layer thickness of greater than about 3.5 percent.

The use of first and second categories here is not intended to limit the sorting to just two categories. In fact, the inspected golf balls may be sorted into multiple categories. For example, the inspected golf balls could be separated into a first category containing golf balls with a center shift relative to the outer layer thickness of about 3.8 percent or less, a second category containing golf balls with a center shift relative to the outer layer thickness of more than about 3.8 percent but less than about 4 percent, and a third category containing golf balls with a center shift relative to the outer layer thickness of greater than about 4 percent.

Moreover, the predefined thresholds may be based on an absolute metric, e.g., a particular error or eccentricity value (rather than a percentage as discussed above), preferably after taking into account the particular type of ball or ball component that is being measured and sorted. In particular, as the outer layer becomes thinner, the predefined threshold or tolerance becomes larger and, thus, the predefined threshold for a dual core golf ball will likely be different/lower than the predefined threshold for a golf ball having just a core and a cover. For example, the predefined threshold for a single core golf ball may be about 0.03 inches out of concentricity whereas the predefined threshold for a dual core golf ball may be about 0.01 inches out of concentricity.

The sorting mechanism may also be configured to remove any golf ball from the workstream that has been calculated to exceed the predefined threshold. In one embodiment, the sorting mechanism may have more than one predefined threshold such that golf balls may be assigned a grade, e.g., A-D, and sorted according to that grade. Any number of permutations may be designed depending on desired sorting. For example, in one embodiment, grade A may include golf balls that have a center shift relative to the outer layer thickness of about 3.8 percent or less, grade B may include golf balls that do not meet grade A, but have a center shift relative to the outer layer thickness of about 3.9 percent or less, grade C may include golf balls that do not meet grades A or B, but have a center shift relative to the outer layer thickness of about 4.0 or less, and grade D may include golf balls that do not meet grades A-C. In another embodiment, grade A may include golf balls that are less than 0.01 inches out of concentricity, grade B may include golf balls that do not meet grade A, but are less than 0.02 inches out of concentricity, grade C may include golf balls that do not meet grades A or B, but are less than 0.03 inches out of concentricity, and grade D may include golf balls that do not meet grades A-C. In any of these embodiments, grade D (or another assigned grade) may include hollows, i.e., golf balls made without centers.

Sorting and/or removal of golf balls from the workstream may be accomplished through a variety of automated or manual ways. In one embodiment, the ball-holding apparatus releases its hold on the rejected ball(s) and the ball(s) is/are dropped into a corresponding chute for recovery and/or disposal of the golf ball. In another embodiment, a robotic arm may remove a rejected ball directly from the ball-holding apparatus.

Additional System Components

The inspection system of the present invention may include additional components for additional inspection. In particular, in one embodiment, the system further includes the ability to capture a visible light image or video. More specifically, in addition to the x-ray source(s), a digital photosensor may capture one or more images of the group of balls in the ball-holding apparatus either at the time of or subsequent to the x-ray image capture. For example, the system may include a reflective material transparent to x-ray radiation that is placed between the x-ray source and the ball-holding apparatus such that the x-ray image and visible light image is captured simultaneously. Alternatively, a digital photosensor may be placed downstream of the imaging system 20 such that at least one visible light image is obtained after the x-ray images are obtained. In either aspect, the digital photosensor may be replaced with a digital video camera.

Golf Ball Construction

The system and method of the present invention may be used with practically any type of ball construction, including unfinished components of golf balls. For instance, the inspected golf balls may have a single core, a dual core, multiple outer core or cover layers. Likewise, the materials used in the golf ball components is not limited by the system and method of the invention.

EXAMPLES

The following non-limiting examples demonstrate embodiments that may be employed in accordance with the present disclosure. The examples are merely illustrative of the preferred embodiments of the present disclosure and are not to be construed as limiting the disclosure, the scope of which is defined by the appended claims.

Example 1

Table 1 provides the center shift relative to the outer layer thickness calculated for a dual core ball having an outer layer thickness of 0.270 inches. After center shift was calculated from the images (as generally shown in FIG. 7 and described above), the balls were sorted according to the following:

Grade A: center shift relative to the outer layer thickness ≤3.7 percent

Grade B: center shift relative to the outer layer thickness >3.7 percent

TABLE 1

Sorting By Center Shift (Relative to Outer Layer Thickness)

| Golf Ball | Center Shift | A | B |
| --- | --- | --- | --- |
| 1 | 2.4 | X | |
| 2 | 3.1 | X | |
| 3 | 1.2 | X | |
| 4 | 2.1 | X | |
| 5 | 3.6 | X | |
| 6 | 4.0 | | X |
| 7 | 3.7 | X | |

TABLE 1-continued

Sorting By Center Shift (Relative to Outer Layer Thickness)

| Golf Ball | Center Shift | A | B |
|---|---|---|---|
| 8 | 1.8 | X | |
| 9 | 3.1 | | X |

Example 2

Table 2 provides the percent of center shift relative to the outer layer thickness calculated for a dual core ball having an outer layer thickness of 0.270 inches. After center shift was calculated, the balls were sorted according to the following:

Grade A: center shift relative to the outer layer thickness ≤3.5 percent

Grade B: 3.5 percent >center shift relative to the outer layer thickness ≤3.7 percent Grade C: 3.7 percent >center shift relative to the outer layer thickness ≤3.8 percent Grade D: center shift relative to the outer layer thickness >3.8 percent

TABLE 2

Sorting By Center Shift (Relative to Outer Layer Thickness)

| Golf Ball | Shift Percent | A | B | C | D |
|---|---|---|---|---|---|
| 1 | 3.8 | | | X | |
| 2 | 3.1 | X | | | |
| 3 | 1.2 | X | | | |
| 4 | 2.1 | X | | | |
| 5 | 3.6 | | X | | |
| 6 | 4.0 | | | | X |
| 7 | 3.7 | | X | | |
| 8 | 1.8 | X | | | |
| 9 | 3.1 | X | | | |

The system and method described and claimed herein are not to be limited in scope by the specific embodiments herein disclosed, since these embodiments are intended as illustrations of several aspects of the disclosure. For example, for illustrative purposes, a number of the embodiments of the present invention are discussed in regard to the inspection of golf balls; however, the principles of the present invention are not limited to finished golf balls and can be used with unfinished golf ball components or any manufactured items that require or benefit from a high degree of concentricity. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A system for determining eccentricity of a plurality of golf balls, comprising:
a radiolucent ball-holding apparatus configured to secure a plurality of golf balls therein, wherein each of the plurality of golf balls comprise a center and a cover;
an imaging system comprising at least one x-ray source and an imager capable of obtaining a first image of the plurality of golf balls at a first orientation and a second image of the plurality of golf balls at a second orientation, wherein the first orientation and the second orientation are perpendicular;
an analyzer operatively coupled to the imaging system and capable of performing an inspection routine on the first and second images comprising determining eccentricity for each of the plurality of golf balls based on a first eccentricity of each corresponding golf ball in the plurality of golf balls at the first orientation and a second eccentricity of each corresponding golf ball in the plurality of golf balls at the second orientation and determining whether the eccentricity meets at least one predetermined threshold; and
a sorting mechanism operatively coupled to the analyzer and capable of classifying each of the plurality of golf balls according to the at least one predetermined threshold.

2. The system of claim 1, wherein the first orientation is along the equator of the golf balls.

3. The system of claim 1, wherein the ball-holding apparatus is capable of rotating between the first and second orientations.

4. The system of claim 1, wherein the ball-holding apparatus is capable of rotating each of the plurality of golf balls therein from the first orientation to the second orientation.

5. The system of claim 1, wherein the x-ray source is capable of rotating from a first angle and a first position to a second angle and a second position.

6. The system of claim 1, wherein the plurality of golf balls comprises at least two golf balls.

7. The system of claim 6, wherein the plurality of golf balls comprises at least four golf balls.

8. The system of claim 1, wherein each of the plurality of golf balls further comprises an outer core layer disposed about the center to form an inner ball, and the cover is disposed about the inner ball.

9. A system for determining eccentricity of a plurality of golf balls, comprising:
a radiolucent ball-holding apparatus configured to secure a plurality of golf balls therein, wherein each of the plurality of golf balls comprise a center and a cover;
a first imaging system comprising a first x-ray source and a first imager capable of obtaining a first image of the plurality of golf balls at a first orientation;
a second imaging system comprising a second x-ray source and a second imager capable of obtaining a second image of the plurality of golf balls at a second orientation, wherein the first orientation and the second orientation are perpendicular;
an analyzer operatively coupled to the imaging system and capable of calculating eccentricity for each of the plurality of golf balls from the first and second images based on the following equation:

$$E_{actual} = \sqrt{(E_{AoR}^2 + E_1^2 E_2^2)}$$

where $E_{AoR}$ is the eccentricity along an axis of rotation, $E_1$ is center shift calculated from the first image, and $E_2$ is center shift calculated from the second image, wherein the analyzer is capable of determining whether the calculated eccentricity meets or exceeds a predefined threshold; and a sorting mechanism operatively coupled to the analyzer and capable of assigning a category to each of the plurality of golf balls according to the predefined threshold.

10. The system of claim 9, wherein the plurality of golf balls comprises at least two golf balls.

11. The system of claim 9, wherein the plurality of golf balls comprises at least four golf balls.

12. The system of claim 9, wherein the first and second images are obtained simultaneously.

13. The system of claim 9, wherein the first orientation is along the equator of the golf balls.

14. The system of claim 9, wherein each of the plurality of golf balls further comprises an outer core layer disposed about the center to form an inner ball, and the cover is disposed about the inner ball.

15. The system of claim 9, wherein the sorting mechanism further comprises a removal apparatus capable of removing a golf ball from the ball-holding apparatus depending on the assigned category.

16. A method of determining concentricity of a plurality of golf balls, comprising:
   providing a plurality of golf balls each comprising a center and a cover;
   securing the plurality of golf balls in a holding apparatus, wherein the holding apparatus is radiolucent;
   providing at least one x-ray imaging system comprising an x-ray source and an imager;
   capturing a first x-ray image of the plurality of golf balls about a first axis;
   capturing a second x-ray image of the plurality of golf balls about the second axis, wherein the second axis is at an angle α to the first axis; and
   using a processor operatively connected to the x-ray imaging system,
   determining eccentricity for each of the plurality of golf balls from the first and second x-ray images based on the following equation:

$$E_{actual} = \sqrt{(E_{AoR}^2 + E_1^2 E_2^2)}$$

where $E_{AoR}$ is the eccentricity along an axis of rotation, $E_1$ is center shift calculated from the first image, and $E_2$ is center shift calculated from the second image; and
   categorizing each of the plurality of golf balls based on whether the calculated eccentricity meets or exceeds a predetermined threshold.

17. The method of claim 16, wherein, before the step of capturing the first x-ray image, further comprising the step of rotating the holding apparatus to a first angle.

18. The method of claim 17, wherein, before the step of capturing the second x-ray image, further comprising rotating the holding apparatus to a second angle, wherein the second angle is perpendicular to the first.

19. The method of claim 16, wherein angle α is 90°.

20. The method of claim 16, wherein the step of providing at least one x-ray imaging system comprises providing a first x-ray imaging system comprising a first x-ray source and a first imager and a second x-ray imaging system comprising a second x-ray source and a second imager, wherein the first and second x-ray imaging systems are positioned perpendicular to each other, and wherein the first imaging system captures the first x-ray image and the second imaging system captures the second x-ray image.

* * * * *